Figure 1:
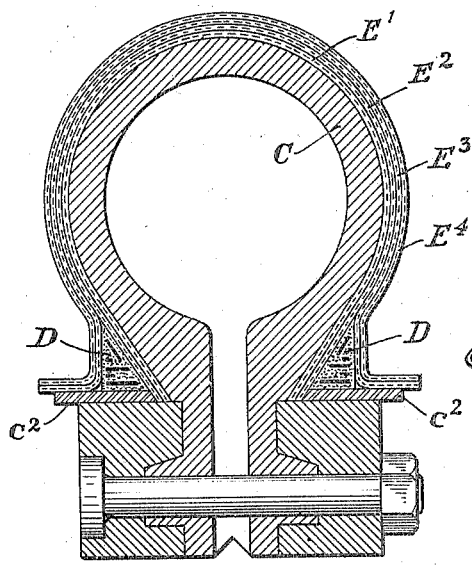

F. A. SEIBERLING & W. C. STATE.
PROCESS OF MAKING TIRE SHOES.
APPLICATION FILED MAY 7, 1909.

948,064.

Patented Feb. 1, 1910.

Witnesses:

Inventors
Frank A. Seiberling
Will C. State
By their Attorneys
Lyons & Bissing

UNITED STATES PATENT OFFICE.

FRANK A. SEIBERLING AND WILL C. STATE, OF AKRON, OHIO; SAID STATE ASSIGNOR TO SAID SEIBERLING.

PROCESS OF MAKING TIRE-SHOES.

948,064.  Specification of Letters Patent.  Patented Feb. 1, 1910.

Application filed May 7, 1909. Serial No. 494,588.

*To all whom it may concern:*

Be it known that we, FRANK A. SEIBERLING and WILL C. STATE, citizens of the United States, and residents of Akron, Summit county, Ohio, have invented a new and useful Process of Making Tire-Shoes, of which the following is a specification, reference being had to the accompanying drawing.

Our invention relates to the process of building up the open-bellied tire-shoes or tire-casings which are ultimately to be used in connection with an inflatable inner tube as pneumatic tires on automobiles. Such tire-shoes are composed of a number of layers of rubber-coated fabric which are applied, one after the other, to a ring-core upon which they are finally vulcanized, such ring-core being made in sections so that it may be removed from the tire-shoe after the vulcanization has been completed. Whether these tire-shoes are of the clencher or of the inextensible-edge type, it becomes necessary, in either case, to apply a bead to each tire-edge during the process of building up the tire on the ring-core, the only difference being that extensible beads are employed for clencher tires and inextensible beads are used when inextensible-edge tires are to be made. It has heretofore been the practice to wind these beads into circular form on the ring-core and this from a continuous strip of bead material. This bead-material has heretofore also been applied to the ring-core in an uncured condition. Such process has the disadvantage that the beads are never exactly the same size when applied and, being uncured, the rolling of the tire-edge in the finishing operation stretches and distorts the beads.

In accordance with our process, we first construct the bead of complete annular shape, preferably in a form of exactly proper size and convenient shape. We thereupon also semi-cure the bead for the purpose of hardening it. We finally apply this bead, in its annular and semi-cured form, to its proper place on the layers of fabric which have already been put on the ring-core. We thus avoid the cumbersome practice of building the bead on the ring-core, a place poorly adapted for the operation. We have a bead of exactly correct size to begin with, because it has been molded in a form of the exact size. We have a bead of the correct size to end with, because the finishing operations will not enlarge or distort the hardened bead. We can therefore, more simply and as cheaply, produce open-bellied pneumatic tires, to which alone our invention relates, having the circumferential lengths of their edges far more uniform than was heretofore possible. This is a matter of prime importance, especially for the inextensible edge-tires, because it is desirable to having the tire-shoe fit the rim as snugly as possible. In the process of manufacture, however, a certain latitude must be allowed for accidental variations. This means that, according to our process, pneumatic tires can be turned out from the factory with a greater average degree of snugness of fit to the rim than has heretofore been obtained.

In building up inextensible-edge tire-shoes, a ring-core having a pair of annular grooves in its opposite faces is customarily employed. To insure proper centering of the beads, we apply cylindrical guides to the grooves, having their outer faces of a size to snugly fit and guide the inner circumferences of the annular beads. In this way the beads are directed to their proper place on the ring-core. Then the final or outer layers of the rubber-coated fabric are applied to the ring-core, the bead still being held in proper position by the cylindrical guide. Finally this guide is removed and the edges of the outer layers of fabric may be turned under the bead to finish the tire-edge. All this will be clear from the drawings, in which—

Figure 2:
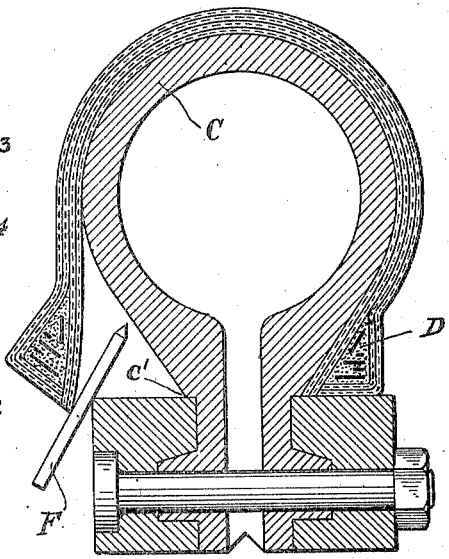
Figure 3:
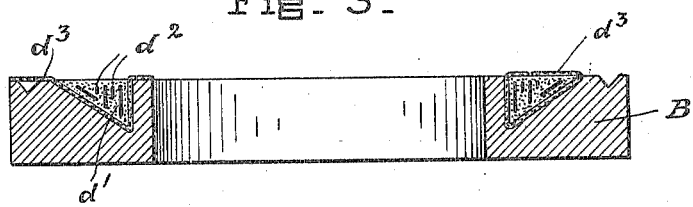
Figure 4:
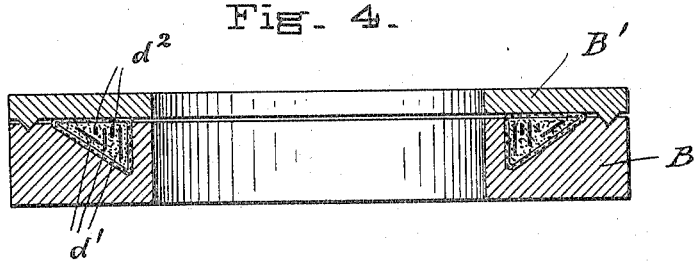
Figure 5:
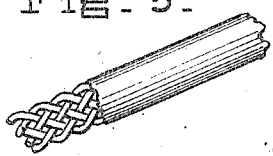

Figure 1 is a cross-section of the ring-core with a cylindrical guide; Fig. 2 is a cross-section of the ring-core with the guide withdrawn and the outer layers of fabric turned under; Fig. 3 is a cross-section of an annular or circular form in which the bead is made up. Fig. 4 is a cross-section of the annular mold in which the bead is semi-cured; and Fig. 5 is a detail of the rubber-coated wire tape from which we build our inextensible beads.

The process of building the inextensible bead D will be readily understood. We preferably utilize a flat wire tape $d'$, shown in Fig. 5, which is coated with rubber so as to make it adhere to adjacent layers. The annular form A, Fig. 3, contains a depressed groove having the shape in cross-section to be given to the bead. This groove is also made of exactly the proper size circumferentially.

It is first supplied with a strip of rubber-coated fabric $d^3$ which is placed in the bottom thereof. Thereupon two or three layers of wire tape $d'$ are wound in this groove and some filling strips $d^2$ are wound in the spaces left between the tape. Then the edges of the rubber-coated fabric $d^3$ are turned over, as indicated on the right of Fig. 3. While other hardening processes may be employed for toughening the bead, we prefer to use the most efficient hardening process known to us,—namely the operation of semi-curing in a vulcanizing mold. This vulcanizing mold B is of the usual form, as shown in Fig. 4, and has a cover for the purpose of firmly compressing the bead D into the groove contained therein. We need hardly add that this groove is also accurately made of the size and shape desired for the finished bead. The bead D, having been transferred from the form A to the groove in the mold B, and the cover B' having been applied and clamped down, the mold is placed in the vulcanizing apparatus and left there for a time sufficient to semi-cure the bead. The word semi-cure is so well understood in the art that it needs no further definition here. Finally the mold is removed from the vulcanizing apparatus and the semi-cured bead is removed from the mold. We come now to the operations of building up the tire-shoe as conducted on the ring-core C, shown in sections in Figs. 1 and 2. There is first applied to the core one or more layers of rubber-coated canvas $E'$, $E^2$, the edges being cut or trimmed so that they lie flush with the bottom of the groove $C''$. Thereupon the cylindrical guides $C^2$ are shoved into the lateral grooves $C''$ and the annular, semi-cured beads D are caused to slide over the guides and into position against the layers of fabric already in place. One or more additional layers of fabric $E^3$, $E^4$ are now placed upon the layers $E'$, $E^2$, their edges are trimmed, the guides $C^2$ are removed, and the edges of the layers $E^3$, $E^4$ are separately turned under the beads D, as shown in Fig. 2, by using a convenient flat tool as a punch for forcing the layers between the surface of the ring-core and the inner face of the bead D. A hand roller is also used to smooth down the layers in this operation. During this finishing operation, the bead D may be pried away from the surface of the ring-core by inserting a flat split ring F therebetween, as shown in Fig. 2. But, by reason of the fact that the bead D is semi-cured, the rather severe finishing operations cause no enlargement or other change in the size of the bead. It is unnecessary to describe the step of attaching the final layer of fabric representing the true cover or tread or the process of vulcanizing the tire-shoe on the core, since these are exactly the same as in the present practice.

While we have described our process, in detail, when inextensible beads are used, it will be understood that for clencher tires using extensible beads the procedure will be the same, excepting that no wire or other non-stretchable substance will enter into the composition of the bead.

We claim,—

1. In the operation of building open-bellied pneumatic tire-shoes from layers of fabric on ring-cores, the process of first constructing an annular bead, hardening the same and then applying it in this annular and hardened form to the ring-core, substantially as described.

2. In the operation of building open-bellied pneumatic tire-shoes from layers of fabric on ring-cores, the process of constructing an annular bead, semi-curing it, and then applying it in its annular form to the ring-core, substantially as described.

3. In the operation of building open-bellied pneumatic tire-shoes having inextensible edges from layers of fabric on ring-cores, the process of winding the non-stretchable bead-material in or on an annular form, semi-curing the bead, and then applying the bead, in its annular form, to the ring-core, substantially as described.

4. In the operation of building open-bellied pneumatic tire-shoes from layers of fabric on ring-cores, the process which consists in constructing an annular bead, applying a cylindrical guide to the ring-core, and sliding the annular bead over the guide into place on the core, substantially as described.

5. In the operation of building open-bellied pneumatic tire-shoes from layers of fabric on ring-cores, the process which consists in constructing and hardening an annular bead, applying a cylindrical guide to the ring-core, sliding the annular hardened bead over the guide into place on the core, removing the guide, and finishing the tire-edges, substantially as described.

In testimony whereof we have signed our names to this specification in the presence of two subscribing witnesses.

FRANK A. SEIBERLING.
WILL C. STATE.

Witnesses:
ROSE M. LEMIEUX,
OTTO W. MYERS.